(12) United States Patent
Hu et al.

(10) Patent No.: US 7,533,157 B2
(45) Date of Patent: May 12, 2009

(54) METHOD FOR DELEGATION OF ADMINISTRATIVE OPERATIONS IN USER ENROLLMENT TASKS

(75) Inventors: Tawei Hu, San Jose, CA (US); Kenneth Carlin Nelson, Hollister, CA (US); Tracee Tao, San Jose, CA (US); Mimi Phuong-Thao Vo, San Jose, CA (US); Yuping Wang, San Jose, CA (US)

(73) Assignee: International Business Machines Corporation, Amronk, NY (US)

( * ) Notice: Subject to any disclaimer, the term of this patent is extended or adjusted under 35 U.S.C. 154(b) by 734 days.

(21) Appl. No.: 10/327,329

(22) Filed: Dec. 24, 2002

(65) Prior Publication Data

US 2004/0122946 A1    Jun. 24, 2004

(51) Int. Cl.
*G06F 15/16* (2006.01)
*G06F 15/173* (2006.01)
*G06F 17/30* (2006.01)
*G06F 7/04* (2006.01)

(52) U.S. Cl. .................. 709/219; 709/217; 709/225; 709/229; 707/9; 707/10; 726/3; 726/6; 726/26

(58) Field of Classification Search .......... 709/225, 709/229, 217, 219; 707/9, 10; 726/3, 6, 726/28
See application file for complete search history.

(56) References Cited

U.S. PATENT DOCUMENTS

| | | | |
|---|---|---|---|
| 5,335,346 A | | 8/1994 | Fabbio |
| 5,649,185 A | * | 7/1997 | Antognini et al. .......... 707/9 |
| 5,715,461 A | | 2/1998 | Yoshitomi |
| 5,784,612 A | | 7/1998 | Crane et al. |
| 5,802,291 A | * | 9/1998 | Balick et al. ............. 709/202 |
| 5,857,203 A | * | 1/1999 | Kauffman et al. .......... 707/200 |
| 5,867,665 A | | 2/1999 | Butman et al. |
| 5,867,667 A | | 2/1999 | Butman et al. |
| 5,870,562 A | | 2/1999 | Butman et al. |
| 5,884,035 A | | 3/1999 | Butman et al. |
| 5,911,143 A | * | 6/1999 | Deinhart et al. ......... 707/103 R |
| 5,941,947 A | | 8/1999 | Brown et al. |
| 5,999,978 A | * | 12/1999 | Angal et al. ............. 709/229 |
| 6,021,410 A | * | 2/2000 | Choy ................... 707/103 R |
| 6,026,430 A | | 2/2000 | Butman et al. |
| 6,044,373 A | * | 3/2000 | Gladney et al. ............ 707/10 |
| 6,044,378 A | * | 3/2000 | Gladney ................ 707/103 R |
| 6,055,637 A | * | 4/2000 | Hudson et al. ............ 726/20 |
| 6,088,679 A | * | 7/2000 | Barkley ..................... 705/8 |
| 6,105,027 A | | 8/2000 | Schneider et al. |
| 6,148,323 A | | 11/2000 | Whitner et al. |
| 6,161,139 A | * | 12/2000 | Win et al. ................ 709/225 |
| 6,178,505 B1 | | 1/2001 | Schneider et al. |
| 6,308,163 B1 | * | 10/2001 | Du et al. ................... 705/8 |

(Continued)

*Primary Examiner*—Kevin Bates
(74) *Attorney, Agent, or Firm*—Sughrue Mion, PLLC (57) ABSTRACT

A method of controlling access in a content management system includes defining a domain among a plurality of domains for the content management system and designating a domain administrator for the domain. This enables the domain administrator to perform administrative tasks within the domain without revealing or affecting information in other domains of the content management system. For example, a domain administrator can view user information only for users associated with that domain. The domain administrator also can associate a user with only the defined domain, thereby limiting the user's access to information in the system to information associated with the domain.

22 Claims, 8 Drawing Sheets

U.S. PATENT DOCUMENTS

| | | | |
|---|---|---|---|
| 6,560,609 B1 * | 5/2003 | Frey et al. | 707/103 R |
| 6,567,818 B1 * | 5/2003 | Frey et al. | 707/103 R |
| 6,671,695 B2 * | 12/2003 | McFadden | 707/102 |
| 6,772,157 B2 * | 8/2004 | Barnett et al. | 707/9 |
| 6,976,023 B2 * | 12/2005 | Chen et al. | 707/9 |
| 7,076,541 B1 * | 7/2006 | Burstein et al. | 709/223 |
| 7,200,869 B1 * | 4/2007 | Hacherl et al. | 726/27 |
| 7,398,311 B2 * | 7/2008 | Joshi et al. | 709/225 |
| 2003/0135611 A1 * | 7/2003 | Kemp et al. | 709/224 |
| 2003/0187956 A1 * | 10/2003 | Belt et al. | 709/219 |
| 2004/0122849 A1 * | 6/2004 | Nelson | 707/102 |
| 2004/0122871 A1 * | 6/2004 | Hansen et al. | 707/204 |

* cited by examiner

ADMINISTRATION DOMAIN TABLE 40

| DOMAIN ID 42 | DOMAIN NAME 44 | ACL SET CODES 46 | PRIVILEGE SET CODES 48 |
|---|---|---|---|
| D0 | RESERVED | AS0 | PS0 |
| D1 | SUPER ADMINISTRATION DOMAIN | AS1 | PS1 |
| D2 | PUBLIC DOMAIN | AS100 | PS250 |
| D3 | COMPANY X DOMAIN | AS27 | PS92 |
| D4 | COMPANY Y DOMAIN | AS53 | PS146 |
| ... | ... | ... | ... |
| D1000 | DEFAULT DOMAIN | AS400 | PS400 |
| ... | ... | ... | ... |
| Dn | | ASn | PSn |

FIG.3B

USER TABLE 50

| USER ID 52 | DOMAIN ID 54 | USER PRIV. SET CODE 56 | DEFAULT ACL SET CODE 58 | DEFAULT RESOURCE MGR. 60 | DEFAULT COLLECTION CODE 62 | PASSWORD 64 | USER NAME 66 | OTHER INDICATORS 68 |
|---|---|---|---|---|---|---|---|---|
| ... | ... | ... | ... | ... | ... | ... | ... | |
| U10 | D1 | PS1 | AS1 | R0 | — | XYZ | SUPER ADMIN. | |
| U11 | D3 | PS92 | AS27 | R1 | S1 | ZYX | X_ADMIN. | |
| U12 | D3 | PS92 | AS27 | R1 | S1 | ABC | X_JSMITH | |
| U13 | D4 | PS146 | AS53 | R3 | S3 | DEF | Y_ADMIN | |
| U14 | D4 | PS146 | AS53 | R3 | S3 | GHI | Y_SJONES | |
| ... | ... | ... | ... | ... | ... | ... | ... | |
| Un | Dn | | ASn | Rn | Sn | | | |

METHOD FOR DELEGATION OF ADMINISTRATIVE OPERATIONS IN USER ENROLLMENT TASKS

BACKGROUND OF THE INVENTION

1. Field of the Invention

The invention relates to information storage and retrieval computer systems. More particularly, it relates to methods, devices, and articles of manufacture for delegating administrative operations in a content management system shared among different organizations.

2. Description of the Related Art

A content management system is a computer-based infrastructure for managing the full spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, enterprise resource planning (ERP), digital asset management, distance learning, World-Wide Web ("Web") content management or other applications to accelerate benefits across the enterprise.

One instance of such a content manager system can be visualized as a triangle, its three vertices being the client, a library server and an object server (resource manager). The client provides the user's interface which gives the user the capability of storing, searching for, and, marking-up documents or other objects. The library server is the equivalent of a card catalog which holds information about the objects, including their location. The object server (OS), also referred to herein as the resource manager (RM) is where either the actual object or a pointer to the actual object is stored.

The core library server logic (except for system utilities and housekeeping tasks) is packaged as a set of relational data base (RDB) stored procedures (SPs) containing embedded SQL statements. Each stored procedure is precompiled and runs on a relational database (RDB) server. Thus, each library server process is a relational database server process. The interface to a library server is SQL, through which either stored procedures can be called or SQL SELECT statements (including cursor support) can be executed. Remote access to the library server is via a relational database client.

The resource managers (RMs) can support different/multiple access protocols. For example, the resource manager, or object server, supports the HTTP protocol. The basic information entities managed by the library server are "items." "Items" as used herein come in two types, simple items and resource items. Resource items can have content associated with them that is stored in one or more resource managers. Resource items point to their content via Resource uniform resource locator (URL) related data.

The library server and resource manager, or object server, are separate processes, often running on different machines. In operation, clients first contact the library server to create/update an index for an object, and to determine where the object is to be stored/replaced. The client then sends a request to the resource manager to store/replace the object.

Administrators of content management systems, as well as other complex computing systems, face a common problem: adding users, changing access rights, or any other administrative operation must be performed by a central administrator. This person has authority to add, update, and delete records for any user of the content management system, including specification of privileges, access rights, and membership in groups. While it is be possible to delegate these tasks to a departmental administrator, it is also necessary to simply trust that this person will not intentionally or accidentally cross the boundary between that department for which that administrator is responsible and other departments. In addition to security concerns, the productivity of administrators is impacted by the quantity of information that is presented to a central administrator.

Figure 1:
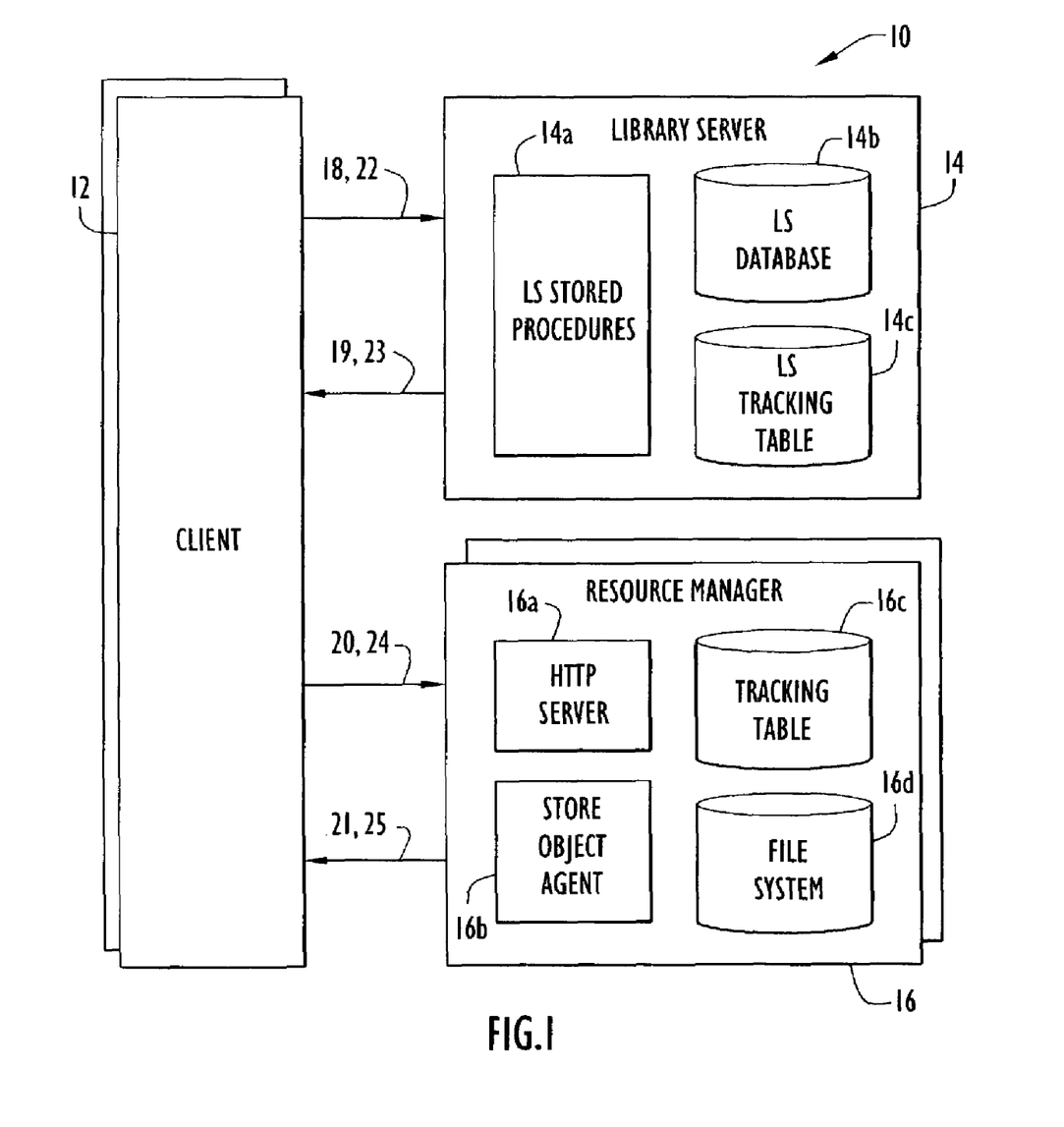
FIG. 1 is a block diagram of a content management system.

These problems are compounded when a service provider operates a content management system that services more than one customer such that the content management system 10, shown in FIG. 1, hosts the content of more than one customer.

To help understand the significance of this problem, consider the scenario in which a service provider offers a content management solution to over 200 independent customers. In that scenario each customer supports 40 users that use three types of documents ("index types") that are stored in the content management system, each of which is processed by seven processing steps ("work baskets"). Accordingly, the content management system stores over 600 types of documents or index types (200 customers×3 document types per customer), with over 1,400 work baskets (200 customers×7 workbaskets per customer), and supporting a total of 8,000 users (200 customers×40 users per customer). Because of the large number of customers, document types, workbaskets, and users, locating the proper resource to which a new user should be authorized can be tedious and occasionally can result in errors. The large lists for defining the index types, workbaskets and users impact both system performance (the time to retrieve the list) and user performance (time to find an entry in the list).

Although the problem is most serious with large installations, customer feedback has shown that this is a concern whenever there is more than one department using the content management system. Accordingly, there is a need to handle administration of content management systems in a more efficient manner that is less burdensome to administrators and in a manner that reduces administrative errors and respects organizational boundaries.

SUMMARY OF THE INVENTION

An embodiment of the invention relates to a method of controlling access in a content management system. The method includes defining a domain among a plurality of domains for the content management system and designating a domain administrator for the domain. This enables the domain administrator to perform administrative tasks within the domain without revealing or affecting information in other domains of the content management system. For example, a domain administrator can view user information only for users associated with that domain. The domain administrator also can associate a user with only the defined domain, thereby limiting the user's access to information in the system to information associated with the domain.

Features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

The embodiments described below are described with reference to the above drawings, in which like reference numerals designate like components.

To reduce the burden on system administrators and gain the benefit of improved productivity, responsiveness to users requests, accuracy and avoid possible security exposures, the content management system described here introduces the concept of administrative domains. A domain can be specified with a numeric identifier together with a name and description to be used to logically relate or isolate information. In the customer scenario described above, 200 domains would be defined, one for each client. Administrators for each domain are defined who are able to manage user enrollment for the domain. By filtering resources by domain, these domain administrators will not see or be able to authorize a user to access a resource in another domain.

The problems with conventional content management systems can be overcome by partitioning administrative aspects of the system into domains. However, prior to describing domains it is helpful to understand the operation of the content management system shown in FIG. 1. Although the content management system shown in FIG. 1 is a client-server system, use of administrative can be used in systems that do not use a client-server architecture.

The content management system 10 shown in FIG. 1 illustrates one or more clients 12, a library server 14, and one or more resource managers 16, and how they interact to store an item. The library server includes library server stored procedures 14a, a library server database 14b, and a library server tracking table 14c. The resource manager includes an HTTP server 16a, a content management resource manager "Store Object" agent 16b, a resource manager tracking table data base 16c, and a file system 16d.

A given object is defined by an entry in an index or list of objects with a unique identifier that is coupled with searchable attributes including a file or resource manager identifier and a collection identifier. The collection identifier describes how the object is to be managed for storage. A collection is a unit of storage: conceptually a cabinet where objects are placed. It may include many volumes of various storage media and a set of rules as to how the actual objects are stored and handled. The library server 14 and each of the plurality of resource managers 16 are used in the content management system 10 to manage digital content.

The library server 14 holds index, attribute and content information in a searchable form within the library catalog 16, which is a relational database. Generally the library server 14 contains a foldering system and references to data objects that may be stored in a resource manager or in other external file systems. The data objects may be any type of digital information, such as multimedia data. The library server 14 also typically contains a workflow system.

The library server 14 includes a plurality of tables that are stored in the library catalog 16. The tables include content and administrative information. A resource manager table maintains information concerning the plurality of resource managers. A collection name table holds the names of each collection for each resource manager. A user table holds information concerning each user of the content management system.

The resource managers 16 each have a file system 16d that holds objects as files or references to other storage systems. The resource manager provides for name translation from library server name to file system name/location and for hierarchical storage management and transport of objects. Each of the resource managers 16 also stores meta information that can be held in the file system or in transaction log files. Each resource manager includes an object server table in which a row exists for each object stored and managed by the resource manager. The row identifies the object and maps its identifier to a local filename.

At a high level, the client begins a transaction and returns confirmation to the end user. Next, the client establishes a connection to the library server, and sends requests 18 to the library server to create a catalog entry (as an index entry) for a content management object. In response, the client receives information 19 back from the library server as to where to store the object. For example, the library server returns to the client a URL for the resource manager where the object is to be stored, an object token, and other information. The client then sends a request 20, such as an HTTP request, to the resource manager to store the object. The client receives a response 21 from the resource manager with object metadata. This metadata includes, by way of exemplification, the object name, size, and creation timestamp. The client sends a message 22 with this metadata to the library server. The library server sends a reply 23 to the client indicating success or failure of the of the metadata update, at which point the client commits the library server updates. After committing the library server updates, the client sends a request 24 to the resource manager to delete its tracking table record. The client receives a reply 25 from the resource manager indicating success or failure in deleting the tracking table entry.

A similar process is followed when the client requests an object stored in the content management system.

To reduce the burden on system administrators and gain the benefit of improved productivity, responsiveness to users requests, accuracy and avoid possible security exposures, a new content management system is described here that introduces the concept of administrative domains.

A domain is a section of a library server that one or more administrators manage. Domains relate to user IDs, user groups, privilege sets, access control lists, resource managers, and collections of items. Domains are not visible to users, but rather are used to simplify and enhance administrative tasks in operating a content management system. Domains are named for the convenience of system administrators. Those names are not known by users but only have meaning to the system administrators who manage them.

Domains limit administrative and user access to only a subsection of the library server. An administrator with full privileges to the library server can delegate limited administrative privileges to another administrator. The administrator with full privileges, referred to as a super administrator, has access to all sections of a library server while an administrator with limited privileges, a subadministrator, has access to only a section of the library server. Use of domains is transparent to users because they do not know that their access has been limited to only a part of the library server. Accordingly, users are aware only of items within that portion, or domain of the content management system to which those users are associated.

Figure 2:
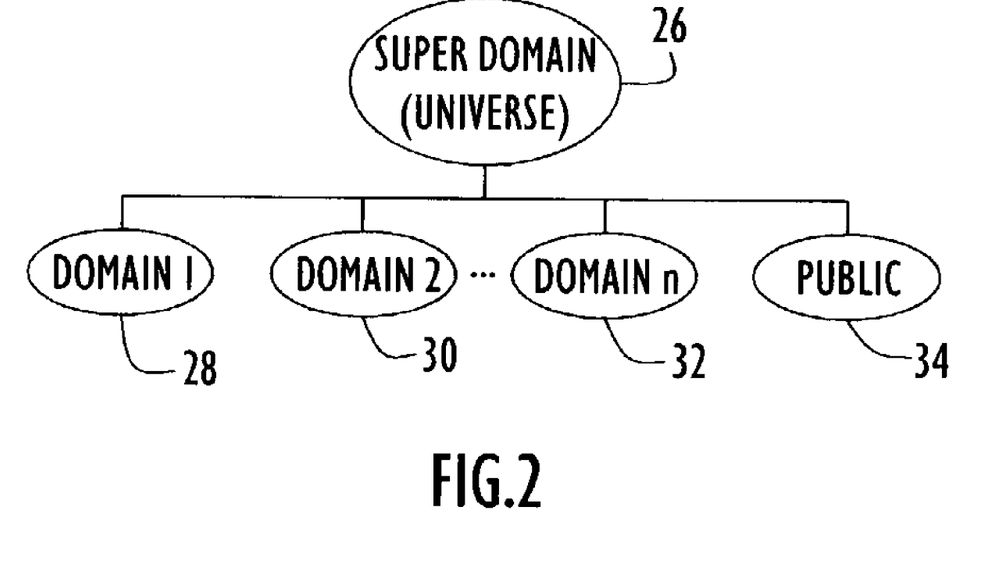
FIG. 2 is a diagram illustrating the concept of administrative domains within a content management system.

FIG. 2 is a conceptual illustration of the relationship of various domains in a content management system. The entire content management system is managed by a super administrator who has total privileges for and access to the entire system. In that regard, the entire content management system can be considered a super domain 26 corresponding to the universe of privileges and access controls. The super domain 26, corresponding to the universal set and encompassing the entire content management system, is managed by the super administrator. The content management system can be partitioned into domains 28, 30 and 32, each of which is named (e.g., Domain 1, Domain 2, Domain-n) and is managed by a subadministrator, also referred to as a domain administrator. A default domain 34 called Public, is a shared domain that is accessible by all administrators and users regardless of the domain to which they are assigned. Partitioning the content management system into domains enables domain administrators to administer only a portion of the content management system while preventing their access to other portions.

Each type of administrator has the ability to create, retrieve, update, and delete the objects in their domains, including users and collections. Domain administrators can view and retrieve objects only in their domain but also can list and retrieve objects in a public, or shared domain.

Domain administrators cannot change the domain of an object. They can, however, access the contents of their own domain and list or retrieve any object in the public, or shared domain.

Super administrators have access to all domains on the library server. They can create an object and assign it to a domain. Some objects, such as privilege sets and access control lists (ACL's), only may be created by a super administrator for a domain administrator to use.

In order to enable domains within the content management system certain tables within the content management system are modified to include a domain ID column. These tables include the user table, the resource manager table, and collection name table. Also, an additional table referred to as the administration domain table is added to the system. It will be understood that other tables can be used or created in accordance with the invention, depending on the application.

Figure 3A:
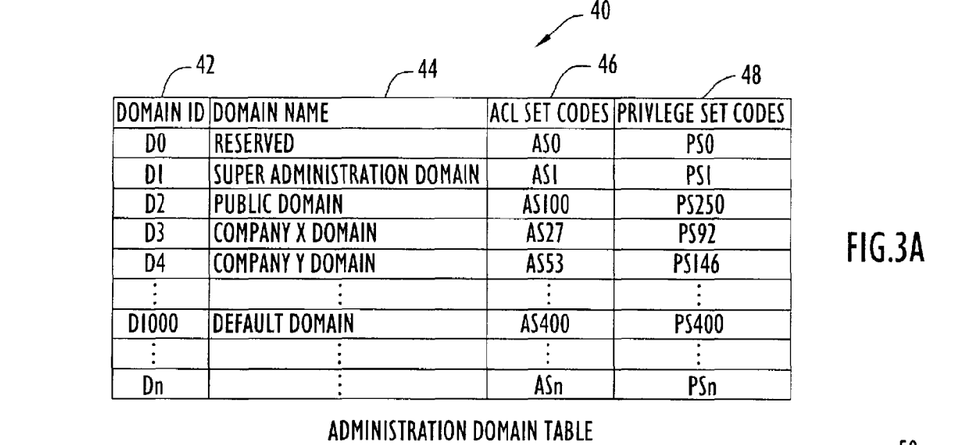
FIGS. 3A-3D are database tables within a content management system that supports administrative domains.

FIG. 3A shows an example of an administration domain table 40. The table includes a domain ID column 42 that holds identifiers of the various domains defined within the content management system. A domain name column 44 provides a descriptive name of the domain. An ACL set codes column 46 and a privilege set codes column 48 relate the ACL set codes and privilege set codes applicable for a domain with its domain ID. For example, in FIG. 3A domain D1 refers to the super domain. That domain is associated with the ACL set code of "AS1" and privilege set code "PS1." Those set codes define sets of access control lists and sets of privileges that are associated with the super administrator. Subdomains such as domains D3 and D4 are domains established for separate organizations, such as different companies using the same content management system. In this example, "Company X" is assigned to domain D3. Company X's access is defined by access control lists associated with access control list set codes, AS27 and AS29. The privileges for Company X are defined by privilege set codes PS92 and PS93. Those access control list set codes and privilege set codes refer to ACL sets and privilege sets that define the access rights and the privileges that are granted to Company X. Accordingly, the domain D3 is limited by those access control lists and privileges.

The administration domain table 40 also includes a public domain D2 that is a shared domain that is accessible by all users of the system. A default domain D1000 is used as the default domain when establishing a user. The system administrator, whether it be a super administrator or a domain administrator, can change the default domain to a domain with which the administrator is authorized to access.

Figure 3B:
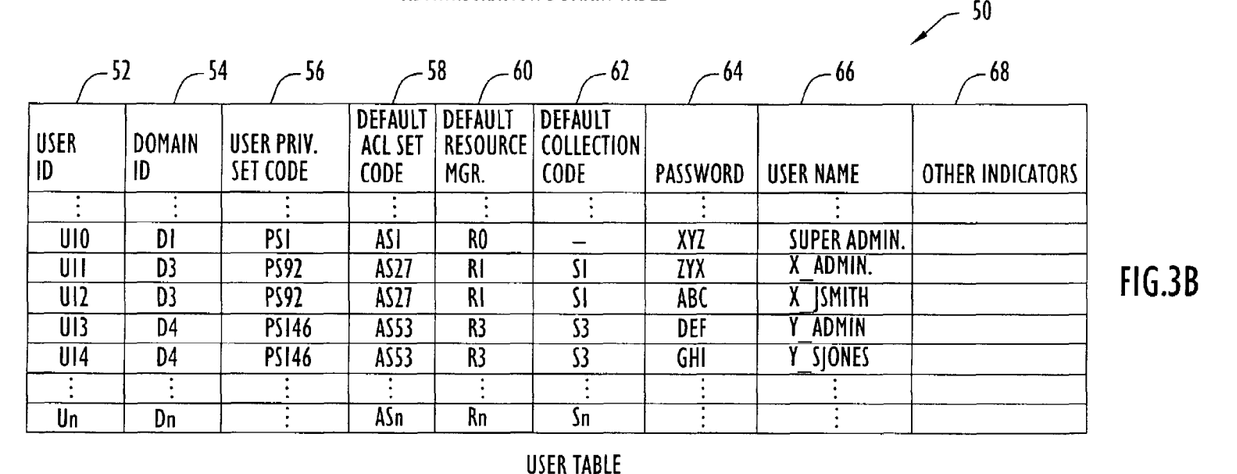

A user table in a content management system 50 is shown in FIG. 3B and includes columns for User ID 52, User Privilege Set Code 56, Default ACL Set Code 58, Default Resource Manager 60, Default Collection Code 62, Password 64, User Name 66, and a column for Other Indicators 68. A domain ID column 54 is added to the user table 50 to support the use of domains.

The User ID column 52 specifies a unique user ID for each user of the content management system. A Domain ID 54 is associated with each user. The user also is associated with certain privileges defined by privilege set codes, and other information pertinent to the user such as a default ACL set for the user, the default resource manager to which objects stored by the user are placed, and a default collection code for the user's objects. The table also specifies a user name (i.e., X_Admin) and a password (i.e., ZYX). In FIG. 3B it can be seen that users X_JSmith and X_Admin are defined within the same domain D3, and user Y_Admin and Y_SJones are defined as being in domain D4. In this example, domain D3 is designated for Company X and domain D4 is designated for Company Y.

Figure 3C:
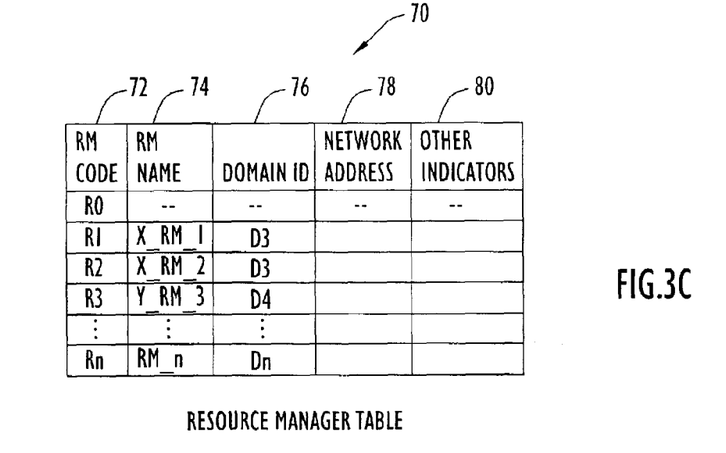

A resource manager is defined by a resource manager code plus other information that defines characteristics of the resource manager and the method of accessing that resource manager over a network, plus a domain ID to restrict visibility to the RM definition. A resource manager (RM) table 70 is shown in FIG. 3C. This table relates information about resource managers with other information needed by the content management system. This table includes an RM Code 72, an RM Name 74 (i.e., X_RM_1), a Domain ID 76, a Network Address 80 indicating an address on a network for the resource manager, and other indicators 80 with information needed by the system. A Domain ID 76 is added to the RM table 70 to associate the resource managers with domains. In the example shown in FIG. 3C, domain D3 is associated with two resource managers, namely resource manager X_RM_1 and X_RM_2. Domain D4 is associated with another resource manager, Y_RM_3. In this example, objects for Company X are stored in resource managers R1 and R2 and objects for Company Y are stored in resource manager R3.

Figure 3D:
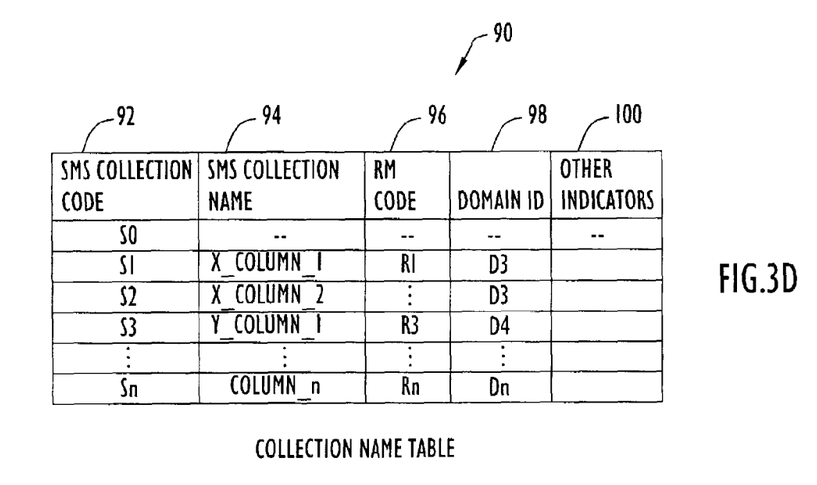

Table 3D illustrates a collection name table for using system-managed storage (SMS) collections in the content management system. This table includes an SMS Collection Code 92, an SMS Collection Name 94, and an RM Code 96 where the collection resides. The table also includes Other Indicators 100 that may be used by the content management system. A Domain ID 98 is added to the collection name table to associate collections with domains. The collection name table associates a particular SMS collection with both a resource manager and a domain. For example, a collection "X_Collection_1," which is resident on the resource manager having RM code R1, is associated with domain D3, and is given an SMS collection code of S1. Similarly, the domain D3 can include a second collection, in this case it is named "X_Collection_2," having an SMS collection code of S2.

In operation, the domains are used to help a system administrator administer subsets of a content management system.

Some of the administrative operations that can be performed as a result of using domains are described below.

Figure 4:
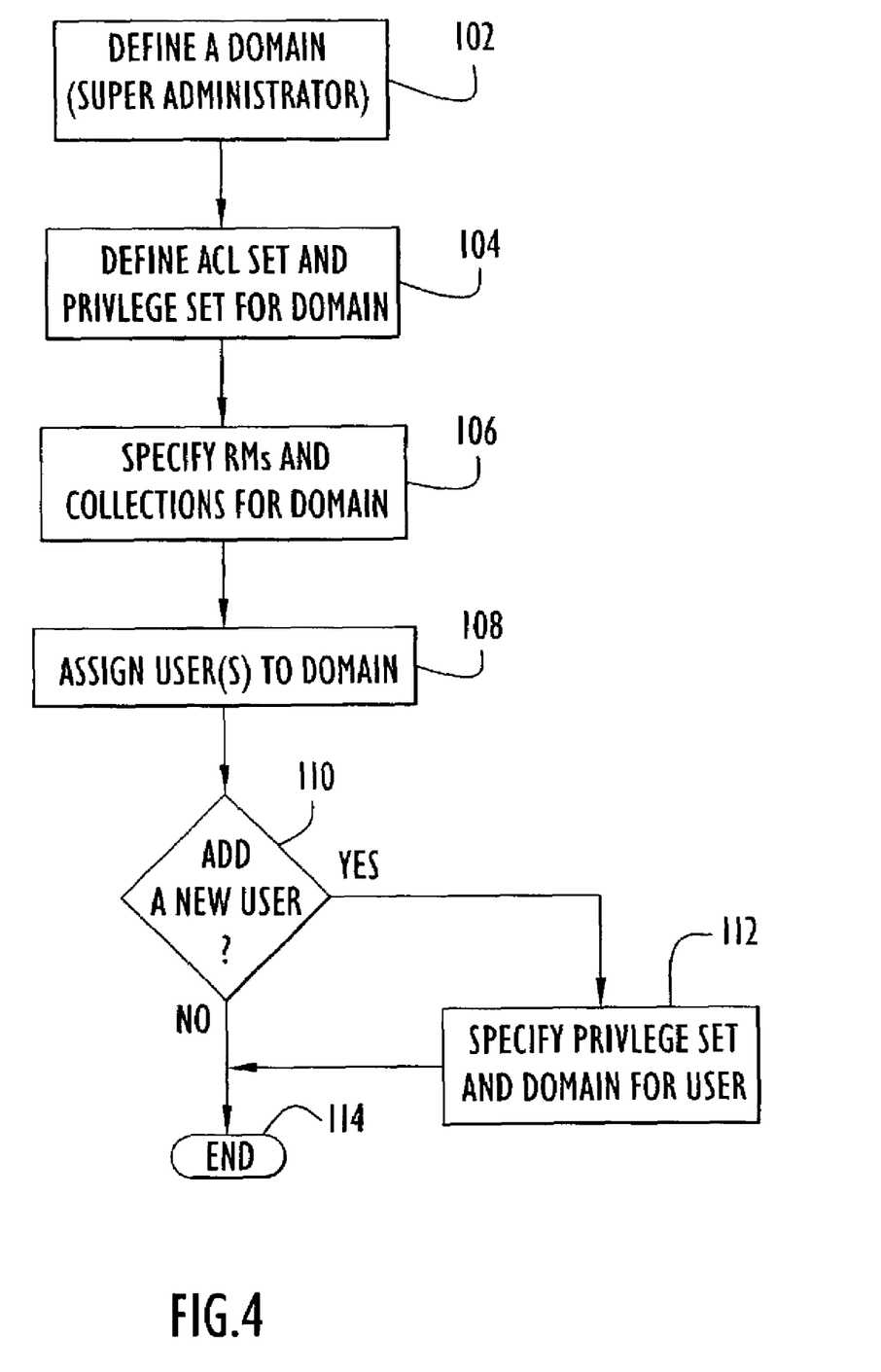
FIG. 4 is a flowchart illustrating a process for defining an administrative domain in a content management system.

FIG. 4 is a flowchart illustrating a process of defining a domain. Referring to FIG. 4, a super administrator, who has the privileges suitable to define a domain within the content management system, initiates defining a new domain in operation 102. Once the new domain is defined, the super administrator, in operation 104, can associate a privilege set with the domain and can create or modify a definition of an ACL set to be associated with the new domain. The super administrator also specifies resource managers and collections for the domain in operation 106. In operation 108 the super administrator assigns previously defined users of the content management system to the domain. In operation 110 the system administrator can also add a new user. If a new user is to be added, the super administrator specifies a privilege set authorized for the domain for that new user in operation 112, and the process ends in operation 114. If no new user is to be added after operation 108 the process ends in operation 114.

When a domain administrator creates a user ID, the administrator has the choice of assigning it to a domain, or letting it remain with a default domain (e.g., Domain D1000) automatically designated at the time the user ID is created. A domain administrator can change the domain associated with the user ID at a later time by changing the user properties specified in the user table. A user ID can have access to only one domain at a time and would not be added to the public, or shared domain.

Only super administrators have the authority to create domains and assign users to those domains as illustrated by the process in FIG. 4. However, once a domain is created, a domain administrator is designated for the domain. That domain administrator can define a new user in the content management system and that new user is restricted to acting only in the domain administrator's domain or in any domain designated as a public domain. While a domain can have more than one domain administrator, only the super administrator can define who those administrators are by granting them the appropriate system administration privileges within a privilege set for that domain.

Figure 5:
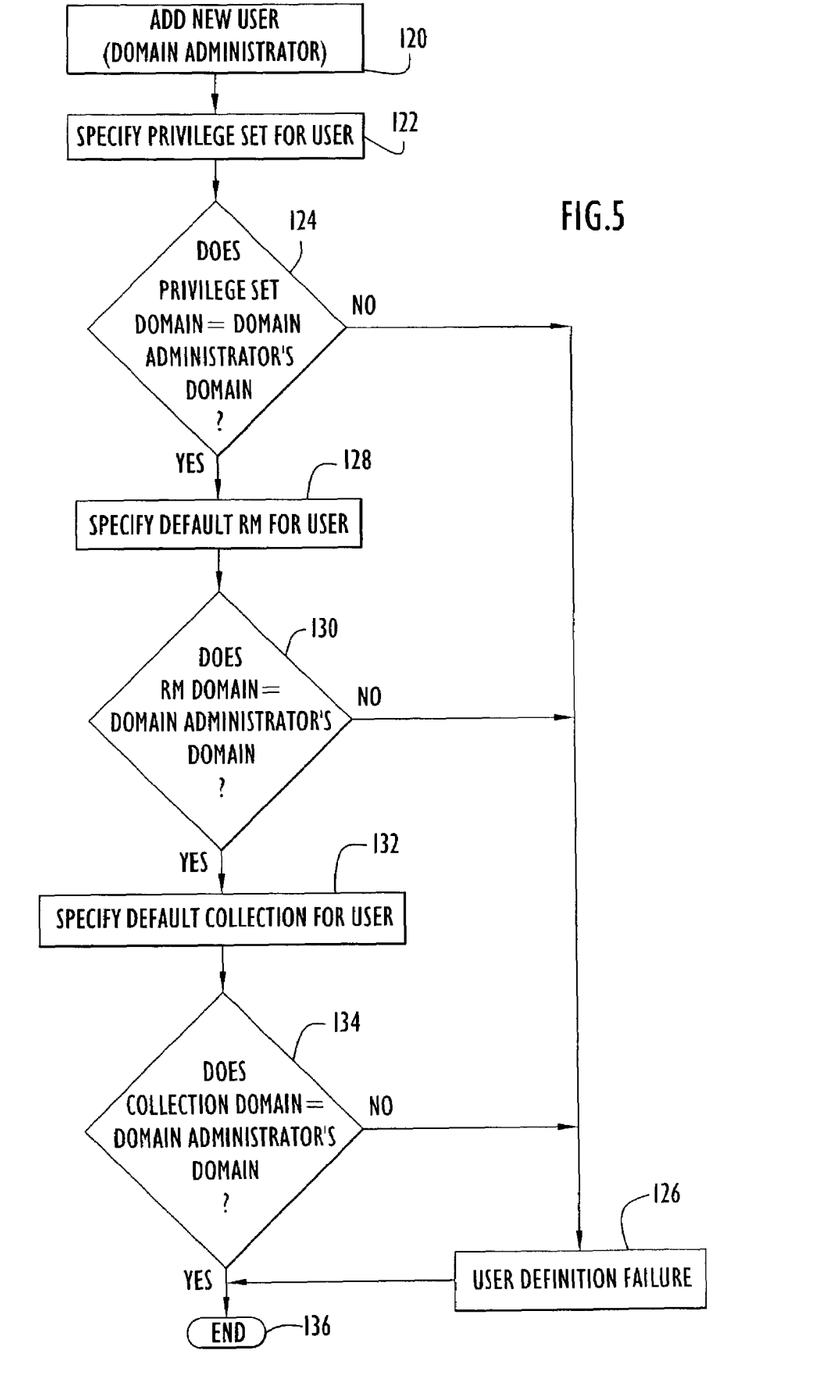
FIG. 5 is a flowchart illustrating a process for adding new users to an administrative domain in a content management system.

A process typically performed by a domain administrator is to add a new user to the domain administered by the domain administrator or to a public domain. FIG. 5 is a flowchart illustrating such a process. Referring to FIG. 5, a domain administrator, in operation 120, such as a domain administrator for Company X, can add a new user to the domain for Company X, i.e., domain D3, or to a public domain. The new user is added without affecting other domains in the content management system, since the new user automatically is associated with the domain administrator's domain or to the public domain designated by the domain administrator. By using domains in the content management system this new user can be added by the domain administrator for Company X without involvement by the super administrator responsible for administering the entire content management system.

Any user ID added to a domain must also have an associated privilege set. The privilege sets can be placed in the public, or shared, domain to make them available to any user. In operation 122 the Company X domain administrator specifies a privilege set for the new user. Here, the content management system, in operation 124, determines whether the domain associated with the specified privilege set is equal to the domain administrator's domain or a public domain. If not, the system prevents those privileges from being associated with the user and the user definition fails in operation 126. If the privilege set is associated with the appropriate domain, then operation 128 is performed in which the domain administrator specifies a default resource manager for the user.

User access can be restricted to one or more resource managers by assigning the user to a specific domain associated with those resource managers. When a new resource manager is defined for a library server to access, it can be associated with a domain, such that users who also are associated with that domain can use that resource manager. The default for all resource managers is public. If all users are not to have access to the resource manager, it must be assigned to a domain. In operation 130 the system checks whether the domain associated with the specified resource manager equals the domain administrator's domain or is in a public domain. If not, the user definition fails 126, but if the domains are equal or if the resource manager is defined in a public domain, operation continues.

User access can be restricted to one or more collections on a resource manager by assigning those collections to a specific domain. Even if the resource manager for the collection is in the public domain, that collection still can be assigned to some other non-shared domain. If the resource manager, however, is defined to a specific domain already, then the collection cannot be assigned to any domain other than the one to which the resource manager is associated. In operation 132 the Company X domain administrator specifies a default collection for the user. In operation 134 it is determined if the domain associated with the specified collection is the same as the domain administrator's domain or is a public domain. If not, then the user definition failure occurs as indicated in operation 126. Otherwise, the user definition ends in operation 136, and the new user is defined for the Company X domain.

Other tasks typically performed by an administrator can be performed by a domain administrator within the appropriate domain. For example, referring to FIG. 6, an administrator can request a list of all users, in operation 150. This function can either list all registered users, regardless of whether they are logged onto the system, or list only the users who are logged on. In either case, the users can be listed by domain. Alternatively, the administrator, in operation 150, can query the content management system for one or more specific users. In generating either the list or performing the query, the system, in operation 152, checks whether the administrator making the request is a super administrator. If so, then in operation 154 all of the users that are defined to the content management system are listed for the super administrator's use in performing an administrative task. If only the logged on users are requested, then only those users logged on are listed. Alternatively, if the request is to query a particular user or set of users, then in operation 154 the system returns the user IDs for all users logged on to the content management system that satisfied the query. The process then ends at operation 158.

Figure 6:
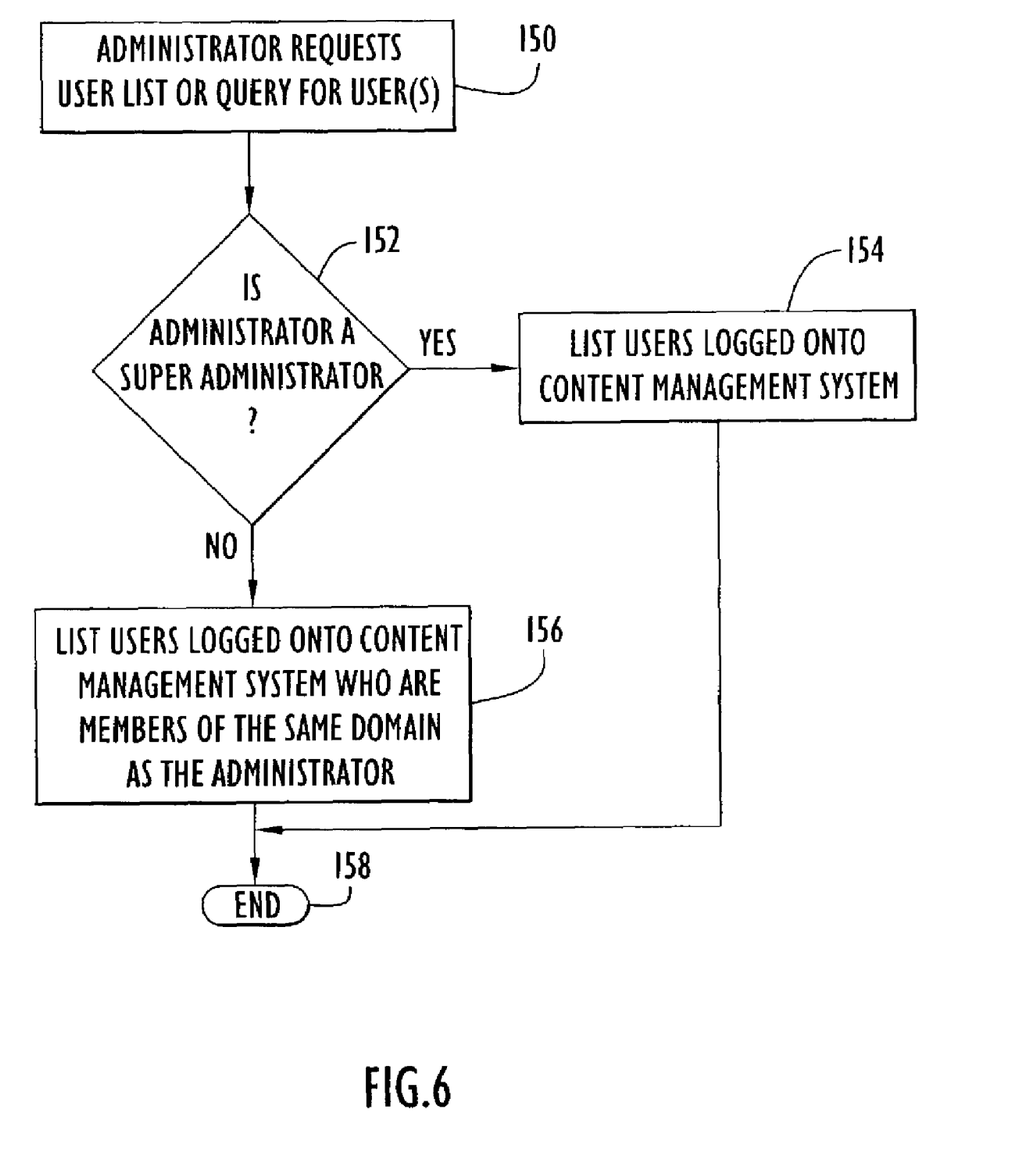
FIG. 6 is a flowchart illustrating a process for listing users associated with an administrative domain in a content management system.

If, in operation 152, the administrator is not a super administrator, then in operation 156 the, content management system lists only the users defined to the system and/or logged on to the system, who are members of the same domain as the administrator making the request. In this manner, a domain administrator can view only users within the administrator's domain. Accordingly, an administrator for Company X can only view the Company X users of the content management system. By using domains in the content management system the domain administrator for Company X does not have visibility into the users of any other domain such as Company Y's domain, even though Company Y's content is hosted on the same content management system.

Figure 7:
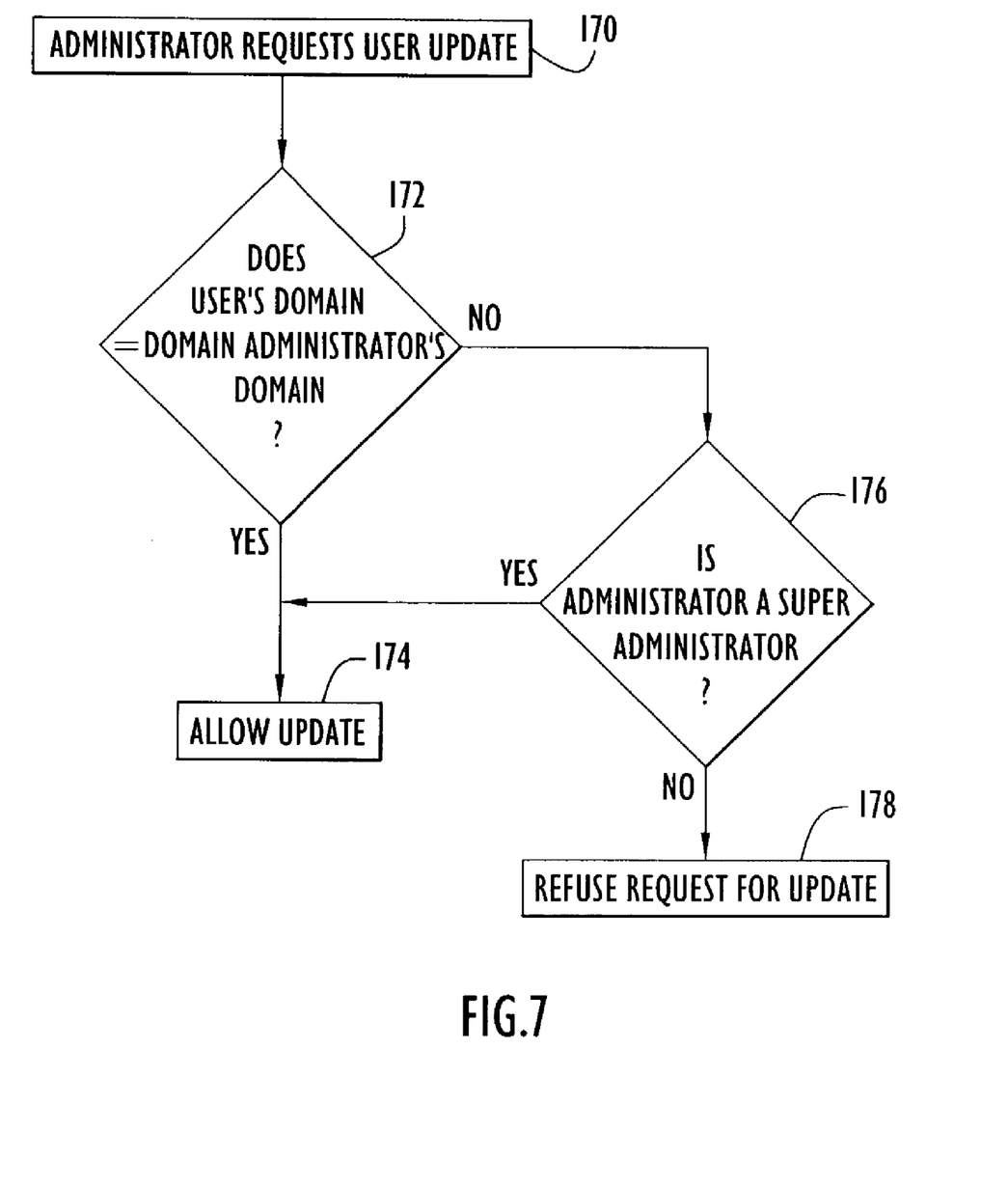
FIG. 7 is a flowchart illustrating a process for updating user ID information in an administrative domain in a content management system.

Another administrative task that can be performed is updating user information. This is illustrated in FIG. 7. In operation 170 an administrator requests an update to user information in the content management system. In operation 172 a determination is made whether the user's domain is the same as the requesting domain administrator's domain. If so, the update is allowed in operation 174. However, if the domains are not equal, the process flows to operation 176 where it is determined whether the administrator is a super administrator. If so, the update operation is allowed in operation 174. However, if the administrator is not a super administrator, then the request is refused in operation 178. In this way a user in one domain cannot update the user information of the user in another domain.

For example, the Company X domain administrator cannot change user information for a user who is a member of the Company Y domain, even though Company Y and Company X share the same content management system. Accordingly, various organizations' information hosted on the same content manager server are separated and kept private.

Still other tasks can be performed by a super administrator. For example, a super administrator can create a user group by grouping together multiple user IDs into a logical group. A group is associated with a domain either a private domain or a public domain. A domain administrator can view users only if the group's domain ID matches the domain administrator's domain ID or is an ID for a public domain. Similarly, a domain administrator can add a user to a group only if the user's domain ID matches the group's domain ID or corresponds to a public domain. A domain administrator can query a group having the same domain ID as the domain administrator, or a group designated as a public group. The system can be configured so that only the users with a domain ID matching the domain administrator's domain ID or are associated with a public domain are listed in response to the query.

It will be appreciated that using domains in a content management system can facilitate other administrative tasks that can be performed by a domain administrator.

Having described apparatuses, articles of manufacture and methods of delegating administrative operations in user enrollment tasks in a content management system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of controlling administrative operations in a data store, the data store comprised of a library server and a plurality of resource managers distributed with respect to the library server, the method comprising:
    defining a domain among a plurality of domains for the data store;
    specifying in the library server at least one of the resource managers to be associated with the domain;
    designating a domain administrator, which is able to create, retrieve, update and delete objects in the domain, for the domain; and
    enabling the domain administrator to perform administrative operations within the domain with respect to information stored in the library server and information objects stored in the at least one resource manager associated with the domain without enabling the domain administrator to access information in at least one other of the plurality of domains, wherein said at least one resource manager comprises:
    an HTTP server which receives a request from a user to store an object in the resource manager and which receives a request from a user to retrieve an object stored in the resource manager, said request to store an object containing a location at which the object is to be stored in the resource manager and said request to retrieve an object containing a location at which the object is stored at in the resource manager;
    a file system holding the information objects; and
    an object server table identifying and mapping the information objects;
    wherein the library server comprises a plurality of tables which maintain information on the plurality of resource managers, holds names of each collection for each resource manager, and holds information concerning users; and
    wherein the data store comprises an administration domain table which lists at a given time, identifiers of the domains defined within the data store, a descriptive name associated with each of the identifiers, an access control list for each of the domains, and a privilege set code associated with each of the domains.

2. The method of claim 1, wherein the data store is a content management system storing multimedia content.

3. The method of claim 2, wherein at least one of the administrative operations the domain administrator is enabled to perform is to associate a user with said domain among the plurality of domains, thereby preventing the user's access to information in at least one other of said plurality of domains of the content management system.

4. The method of claim 2, wherein the content management system includes the administration domain table that associates the domain with a set of privileges.

5. The method of claim 4, wherein the administration domain table associates the domain with an access control list.

6. The method of claim 5, wherein the content management system includes a user table having a row containing a user identifier, and a user is identified by adding an identifier for the domain in said row.

7. The method of claim 1, wherein the library server and the at least one resource manager each execute as separate processes.

8. The method of claim 1, wherein said at least one resource manager provides at least one of translation of the information from the library server, hierarchical storage of the information objects, and transport of the information objects.

9. The method of claim 1, wherein the objects stored in said at least one resource manager are indexed by collections, and wherein said collections comprise units of storage where the objects are placed and rules regarding storage and handling of the objects.

10. The method of claim 1, further comprising specifying in the library server at least one collection on the at least one of the associated resource managers to be associated with the domain, said at least one collection representing a plurality of objects to be associated with the domain.

11. The method of claim 1, wherein said information on the plurality of resource managers comprises a resource manager code, a name of the resource manager, at least one domain associated with the resource manager, and a network address of the resource manager.

12. A method of limiting an administrator's actions in a content management system, the content management system comprising a library server and a plurality of resource managers distributed with respect to the library server, wherein the administrator is associated with an administrative domain defined for the content management system, the method comprising:
- determining, in response to receiving a request by the administrator to take an action with respect to information stored in the library server and information objects stored in the at least one resource manager, the domain associated with the administrator; and limiting the requested action to the information and the information objects that are associated with a domain that matches the domain associated with the administrator,
- wherein the administrator associated with the administrative domain is able to create, retrieve, update and delete the information objects in the domain;
- wherein said at least one resource manager comprises:
- an HTTP server which receives a request from a user to store an object in the resource manager and which receives a request from a user to retrieve an object stored in the resource manager, said request to store an object containing a location at which the object is to be stored in the resource manager and said request to retrieve an object containing a location at which the object is stored at in the resource manager;
- a file system holding the information objects; and
- an object server table identifying and mapping the information objects;
- wherein the library server comprises a plurality of tables which maintain information on the plurality of resource managers, holds names of each collection for each resource manager, and holds information concerning users; and
- wherein the content management system comprises an administration domain table which lists at a given time, identifiers of the domains defined within the content management system, a descriptive name associated with each of the identifiers, an access control list for each of the domains, and a privilege set code associated with each of the domains.

13. The method of claim 12, wherein the requested action is a listing of users identifiers of the content management system, and said limiting the requested action lists only the users' identifiers associated with the domain associated with the administrator or a public domain.

14. The method of claim 12, wherein the requested action is a listing of resource managers defined in the content management system for storing content objects and said limiting the request lists only the resource managers associated with the domain associated with the administrator or a public domain.

15. The method of claim 12, wherein the requested action is a listing of collections of objects defined in the content management system and stored in a resource manager, and said limiting the request lists only the collections associated with the domain associated with the administrator or a public domain.

16. The method of claim 12, further comprising defining a user in the content management system and associating with the user the domain associated with the administrator.

17. The method of claim 16, wherein the content management system includes a user table having a row containing an identifier for the user, and the user is associated with the domain by adding an identifier of the domain to said row containing the user identifier.

18. The method of claim 12, further comprising defining a resource manager in the content management system and associating with the resource manager the domain associated with the administrator.

19. The method of claim 12, further comprising defining a collection of objects stored in a resource manager in the content management system and associating with the collection the domain associated with the administrator.

20. The method of claim 12, further comprising defining a super administrator by associating a predetermined domain identifier designated to allow access to all domains defined in the content management system, wherein if said administrator is a super administrator, said limiting the requested action is not performed.

21. The method of claim 12, the method further comprising:
- determining the administrator's rights within the domain associated with the administrator; and
- limiting the requested action in accordance with the administrator's rights within the domain.

22. The method of claim 12, wherein the library server and the at least one resource manager each execute as separate processes.

* * * * *